US011034870B2

(12) United States Patent
True et al.

(10) Patent No.: US 11,034,870 B2
(45) Date of Patent: Jun. 15, 2021

(54) ONE-COMPONENT COMPOSITION BASED ON ALKOXYSILANES AND METHOD OF JOINING OR ENCAPSULATING COMPONENTS USING THE COMPOSITION

(71) Applicant: DELO INDUSTRIE KLEBSTOFFE GMBH & CO. KGAA, Windach (DE)

(72) Inventors: Markus True, Untermeitingen (DE); Markus Ehret, Seefeld (DE)

(73) Assignee: DELO INDUSTRIE KLEBSTOFFE GMBH & CO. KGAA, Windach (DE)

( * ) Notice: Subject to any disclaimer, the term of this patent is extended or adjusted under 35 U.S.C. 154(b) by 169 days.

(21) Appl. No.: 16/312,367

(22) PCT Filed: May 26, 2017

(86) PCT No.: PCT/EP2017/062750
§ 371 (c)(1),
(2) Date: Dec. 21, 2018

(87) PCT Pub. No.: WO2017/220283
PCT Pub. Date: Dec. 28, 2017

(65) Prior Publication Data
US 2019/0194509 A1 Jun. 27, 2019

(30) Foreign Application Priority Data
Jun. 24, 2016 (DE) .................... 10 2016 111 590.8

(51) Int. Cl.
| | |
|---|---|
| C09J 183/06 | (2006.01) |
| C09D 183/12 | (2006.01) |
| C09J 183/12 | (2006.01) |
| C08G 77/06 | (2006.01) |
| C08G 77/18 | (2006.01) |
| C09D 183/06 | (2006.01) |
| C09J 5/06 | (2006.01) |
| C09K 3/10 | (2006.01) |
| C08G 77/46 | (2006.01) |
| C08G 77/00 | (2006.01) |

(52) U.S. Cl.
CPC ............ C09J 183/06 (2013.01); C08G 77/06 (2013.01); C08G 77/18 (2013.01); C09D 183/06 (2013.01); C09D 183/12 (2013.01); C09J 5/06 (2013.01); C09J 183/12 (2013.01); C09K 3/1018 (2013.01); C08G 77/46 (2013.01); C08G 77/70 (2013.01); C08G 2150/00 (2013.01); C08G 2170/80 (2013.01); C09J 2301/416 (2020.08); C09J 2483/00 (2013.01); C09K 2200/0685 (2013.01)

(58) Field of Classification Search
CPC ..... C09J 201/10; C09J 183/06; C08L 101/10; C08G 77/18; C08G 77/08; C09D 183/06
See application file for complete search history.

(56) References Cited

U.S. PATENT DOCUMENTS

| | | |
|---|---|---|
| 3,979,344 A | 9/1976 | Bryant et al. |
| 5,154,791 A | 10/1992 | Gasser et al. |
| 5,364,955 A | 11/1994 | Zweiner et al. |
| 5,696,179 A | 12/1997 | Chawla |
| 6,020,449 A | 2/2000 | Scheim |
| 6,306,555 B1 | 10/2001 | Schulz et al. |
| 6,485,886 B1 | 11/2002 | Yamato et al. |
| 9,068,104 B2 | 6/2015 | True et al. |
| 9,957,398 B2 | 5/2018 | Hugenberg et al. |
| 2001/0041231 A1* | 11/2001 | Kagawa ............. C09K 19/0208 428/1.1 |
| 2007/0219285 A1 | 9/2007 | Kropp et al. |
| 2009/0234072 A1* | 9/2009 | Nakagawa ............. C08G 77/16 525/100 |
| 2012/0329897 A1 | 12/2012 | True et al. |

(Continued)

FOREIGN PATENT DOCUMENTS

| | | |
|---|---|---|
| CN | 102791818 B | 11/2012 |
| DE | 3702999 A1 | 8/1988 |
| DE | 39 09 688 A1 | 9/1990 |

(Continued)

OTHER PUBLICATIONS

Translation of ISA written opinion.*
WO 2016 125692 machine translation (2016).*

*Primary Examiner* — Kuo Liang Peng
(74) *Attorney, Agent, or Firm* — McNees Wallace & Nurick LLC

(57) ABSTRACT

A composition curing upon exposure to moisture comprises (A) one or more at least bifunctional silane compounds with at least two alkoxysilane groups, (B) at least one monofunctional silane compound with only one alkoxysilane group, and/or a partially condensed or bridged derivative thereof, and (C) at least one acid generator which, upon exposure to actinic radiation or heat, releases an acid. In addition, further additives (D) may be contained in the compositions according to the present invention. The composition is liquid at room temperature and, apart from the latent acid generator, does not contain any further catalysts for moisture-curing of alkoxysilanes. After activation of the acid generator the composition cures in the presence of moisture, while remaining liquid at room temperature in the presence of humidity over a period of at least 24 hours prior to activation of the acid generator. Furthermore, a method of joining or casting structural elements using the composition is described.

24 Claims, No Drawings

(56) References Cited

U.S. PATENT DOCUMENTS

2013/0274381 A1    10/2013   Hugenberg et al.
2016/0152861 A1     6/2016   Matsuo et al.

FOREIGN PATENT DOCUMENTS

| | | |
|---|---|---|
| DE | 19923300 A1 | 11/2000 |
| DE | 102007017842 A1 | 10/2008 |
| DE | 102010010598 A1 | 9/2011 |
| DE | 10 2011 083 960 A1 | 4/2013 |
| EP | 0343690 A2 | 11/1989 |
| EP | 0508046 A1 | 10/1992 |
| EP | 0819749 A2 | 1/1998 |
| EP | 0 885 933 B1 | 8/2000 |
| EP | 1 124 832 A1 | 8/2001 |
| EP | 1591464 A1 | 11/2005 |
| EP | 1923431 A1 * | 5/2008 ............ C09J 133/06 |
| EP | 1923431 A1 | 5/2018 |
| WO | 9802493 | 1/1998 |
| WO | 9840439 | 9/1998 |
| WO | 00/26219 | 5/2000 |
| WO | 03008404 A2 | 1/2003 |
| WO | 03014226 A1 | 2/2003 |
| WO | 03018658 A1 | 3/2003 |
| WO | 03072567 A1 | 9/2003 |
| WO | 2005097883 A2 | 10/2005 |
| WO | 2005100482 A1 | 10/2005 |
| WO | 2006014786 A1 | 2/2006 |
| WO | 2013083505 A1 | 6/2013 |
| WO | 2013091491 A1 | 6/2013 |
| WO | 2015/700706 A1 | 12/2015 |
| WO | 2016125692 * | 8/2016 |

* cited by examiner

ONE-COMPONENT COMPOSITION BASED ON ALKOXYSILANES AND METHOD OF JOINING OR ENCAPSULATING COMPONENTS USING THE COMPOSITION

FIELD OF THE INVENTION

The present invention relates to one-part compositions based on alkoxysilane compounds and photolatent and/or heat-latent acids which are liquid at room temperature and moisture-curing, in particular for use in bonding, sealing and coating of structural elements.

Additionally, the invention relates to a method of joining or casting structural components using the one-part composition, in particular a method in which the composition is pre-activated by exposure to heat or actinic radiation.

TECHNICAL BACKGROUND

In the state of the art, compositions based on silane-functional polymers which cure in the presence of moisture have long been known. They have been used, among other things, for sealing, coating and adhesive compositions. However, curing speed at room temperature is often low, and alkaline, acidic or metal-containing catalysts have to be added.

EP 1 591 464 A1 discloses moisture-curing polyether urethanes functionalized at terminal positions with reactive silane groups. Typically, organotitanate or organotin compounds are added as catalysts to such systems. However, in particular titanium-containing catalysts such as titanium tetraisopropanolate are not compatible with nitrogen-containing compounds. Thus, the described compositions cannot be used in combination with common nitrogen-containing adhesion promoters as these act as catalyst poisons. In addition, tin-containing catalysts can contain traces of toxic tributyltin derivatives and are questionable for toxicological reasons.

In addition, alkaline compounds can be used as metal-free catalysts to accelerate the condensation reaction of silane polymers. U.S. Pat. No. 3,979,344 A describes the use of amino-functional silanes for catalyzing moisture-curing of silane-terminated polyurethanes. It is further known from EP 0 819 749 that the use of silanes such as γ-aminopropyltrimethoxysilane in silane-containing sealant compositions contributes to adhesion improvement. However, in both cases, the use of alkaline aminosilanes, even at low concentrations, has a negative effect on the processing times.

EP 1 421 129 A1 describes the use of α-alkoxysilane-terminated polyurethanes for fast-curing one-part compositions which, in a preferred embodiment, are free of tin compounds. However, many of the exemplary compositions from EP 1 421 129 still contain small amounts of alkaline aminosilanes acting as curing catalysts. α-Alkoxysilanes are characterized by a higher reactivity as compared to γ-silanes and can thus be cured at room temperature at sufficient speed using smaller amounts of catalysts.

WO 2003/014226 discloses a blend of α-silanes and γ-silanes to formulate moisture-curing compositions. Storage-stable compositions can only be formulated by further addition of special α-silanes. This restricts the freedom for formulation and requires, in individual cases, a specific mixing ratio of α-silanes and γ-silanes to obtain stable compositions.

It is known to those skilled in the art that an increase in the long-term storage stability of moisture-curing compositions can be achieved by purposeful addition of water scavengers. They react with water without initiating crosslinking of the composition. EP 0 819 749 describes, for example, the use of low molecular weight alkoxysilanes such as trimethoxyvinylsilane (VTMO) or isocyanates such as p-toluenesulfonyl isocyanate for water scavenging. From DE 19 923 300 A the use of phosphoric acid esters to stabilize alkoxysilane-functional polyurethanes in the presence of alkaline fillers is known.

Moreover, silane-containing formulations are known in which, apart from moisture-curing, another curing mechanism is implemented. U.S. Pat. No. 5,696,179 A, WO 2013/091491 A and DE 10 2010 010 598 A disclose additional curing by exposure to actinic radiation achieved by adding a (meth)acrylate-containing reactive diluent. Besides, it is known from WO 2006/014786 A that dual curing can also be achieved by the use of alkoxysilane-terminated oligomers which, apart from moisture-curing groups, also contain radiation-curing (meth)acrylate groups in the molecule.

From the process technology point of view a variable open-time window between irradiation of the composition and joining of the structural elements to make a bonded joint is desirable. This allows a composition to be activated by actinic radiation on a first structural element before it is brought into contact with a second structural element. In this way, even non-radiolucent join partners can be bonded by pre-activating the composition.

Adhesive and sealant compositions with cationically polymerizable components which can be activated by irradiation are described in DE 3 909 688 A1. The compositions are activated prior to joining in radiolucent storage containers such as transparent cartridges by irradiation with light at a wavelength ranging from 400 to 600 nm. Following activation, the compositions have a maximum open time in the range of hours. Although the compositions allow higher process diversity, they can be dosed, after activation, only within a very limited time window in the range of a few hours.

Additionally, from US 2007/0219285 adhesive and sealant compositions based on acrylate- and silane-containing polymers and curable in a two-step procedure are known. These compositions, apart from a radical photoinitiator, also contain a photolatent acid which catalyzes moisture-curing after having been irradiated. The initial crosslinking is achieved by radical polymerization of the acrylate-containing components. For sufficient initial strengths a high acrylate content is necessary.

EP 0 966 503 A discloses a moisture-sensitive composition which is based on reactive silanes and photolatent acids as catalysts and cures when needed. As acid-generating agent, in particular onium compounds can be used. The photolatent acids are used at relatively high concentrations. The described compositions are used as release coatings. In addition, the silane-functional compounds preferably bear fluorinated groups in their polymeric backbone. EP 0 966 503 does neither disclose the use for bonding and sealing nor contain any information about processability and long-term storage stability of the compositions.

From WO 2005/100482 A a light-induced moisture-curing composition based on a silyl-terminated polymer and a photolatent base which is free of (meth)acrylate-containing reactive diluents is known. The use of α-silane-terminated polymers based on polyurethanes, polyesters and polyethers is particularly preferred. A disadvantage of this approach is that in such formulations the photolatent base catalyzes silane crosslinking in the presence of moisture traces even without irradiation, thus limiting processing time. Moreover, the use of γ-aminopropyl trimethoxysilane as an adhesion promoter and co-catalyst described in WO 2005/100482 A further results in a reduction of the open times. In formulations containing only 1 weight percent of the respective aminosilane a skin is formed within a few hours after dosing even without irradiation.

WO 2005/100482 A further describes a joining method for photoactivatable α-silane-containing compositions in which a process sequence of dosing, exposure to moisture and irradiation can be arbitrarily selected. However, due to the presence of nitrogen bases, the compositions have a low inherent storage stability, which, in the case of a production stop, can lead to an obstruction of the dosing device or to premature undesired curing of the composition on a structural element. At the same time, the post-irradiation skin formation times for the described compositions are in the range of several minutes. Thus, quick fixation of structural elements is not possible as it takes a long time to achieve sufficient initial strengths between the join partners. Although the open times of the known compositions can be prolonged by reducing the alkaline proportions of the formulation, this has a negative effect on the post-irradiation skin formation times.

In industrial joining processes, apart from long processability, high storage stability and quick curing characteristics, flexibility with regard to the processing of corresponding compositions is often desired. Ideally, during a production stop, the silane-containing compositions should not cure, and wetted pipelines or other mechanical parts should not stick together. If the silane-containing compositions cure during a prolonged production stop, extensive rinsing procedures have to be performed and dosing needles or supply lines exchanged. Accordingly, long open times are advantageous. Ideally, a curable composition, even in the presence of humidity, should not tend to gel and should remain in the liquid state over a prolonged period of time. Fast curing is only desired upon activation by actinic radiation or heating.

SUMMARY OF THE INVENTION

It is the object of the present invention to avoid the disadvantages of the compositions known from the state of the art and to provide moisture-curing compositions which, on the one hand, are storage-stable over a long period of time even in the presence of moisture and remain liquid after dosing as long as possible without irradiation, but form a skin shortly after irradiation and achieve high initial strengths.

Preferably, the compositions should be activatable in advance. In addition, in particular for casting applications, it is desirable to be able to perform activation of the composition and subsequent application by means of a dosing device at different times and locations. Thus, production stops cannot have a negative effect on the storage stability of compositions already activated. Preferably, the curing characteristics of the activated compositions should not change even over a long period of time.

According to the present invention, this object is solved by a one-part moisture-curing composition according to claim 1.

Advantageous embodiments of the compositions according to the present invention are stated in the subclaims.

Another object of the invention is the use of the compositions according to the present invention as an adhesive or sealant for bonding, casting, sealing and coating of substrates, particularly in the field of electronics.

The composition according to the present invention comprises (A) one or more at least bifunctional silane compounds with at least two alkoxysilane groups, (B) at least one monofunctional silane compound with only one alkoxysilane group, and/or derivatives of the monofunctional silane compound with partially condensed or bridged alkoxysilane groups, and (C) at least one acid generator which can be activated and releases an acid upon exposure to actinic radiation or heat. In addition, further additives (D) may be contained in the compositions according to the present invention.

The composition is liquid at room temperature and, apart from the acid generator, does not contain any further catalysts for moisture-curing of alkoxysilanes.

The present invention is characterized in that the disadvantages described in the state of the art are successfully overcome. This is accomplished by providing storage-stable, optionally pre-activatable, moisture-curing one-part compositions based on silane-containing compounds and latent acids without adding further catalysts for moisture-curing of alkoxysilanes, except inevitable impurities. The compositions according to the present invention, even in the presence of moisture, remain in the liquid state over a period of at last 24 hours and cure only upon irradiation and/or thermal activation of the acid generator. Conversely, activated compositions remain liquid over a period of at least 24 hours as long as no moisture is present. Thus, two conditions independent from each other have to be complied with for complete curing of the compositions.

By variation of the irradiation dose and use of various formulation parameters the open times of the formulation can be adjusted such that the compositions according to the present invention can be pre-activated. Pre-activation of the compositions is particularly advantageous if non-radiolucent substrates are to be cast or bonded. Additionally, the compositions are characterized in that only small amounts of latent acid and none of the other curing catalysts otherwise common in moisture-curing are needed to achieve quick and complete skin formation at room temperature. Preferably, the described compositions are suitable for bonding, sealing and coating.

According to a preferred embodiment of the moisture-curing composition, the at least two alkoxysilane groups of the bifunctional silane compound are linked, preferably terminally, to a polymeric residue.

Preferably, the at least bifunctional silane compound comprises one or more at least bifunctional α-alkoxysilane compounds. The α-alkoxysilane compounds are particularly reactive and thus allow the provision of moisture-curing compositions exhibiting skin formation upon activation of the latent acid generator within a very short period of time. The at least bifunctional silane compound can consist of one or more α-alkoxysilane compounds.

According to another embodiment, the bifunctional silane compound comprises one or more at least bifunctional α-alkoxysilane compounds and optionally one or more further at least bifunctional alkoxysilane compounds with at least two alkoxysilane groups, with the alkoxysilane groups comprising a Si-atom linked, via an alkylene group, to a heteroatom, with the alkylene group having at least two C (carbon) bridge atoms, preferably 3 to 6 C bridge atoms. Particularly preferably, the further at least bifunctional silane compound is an at least bifunctional γ-alkoxysilane in which the alkylene group is an optionally substituted propylene group.

In addition, the invention also encompasses embodiments of the moisture-curing composition in which the at least bifunctional silane compound consists of one or more at least bifunctional alkoxysilane compounds in which the alkoxysilane groups have a Si-atom linked, via an alkylene group, to a heteroatom, with the alkylene group having at least two C bridge atoms, preferably 3 to 6 C bridge atoms, and being particularly preferably an optionally substituted propylene group.

Beside the at least bifunctional silane compound, the composition according to the present invention contains at least one monofunctional silane compound having only one single alkoxysilane group. Preferably, the monofunctional silane compound is a monomeric, in particular low molecular weight, compound and serves particularly as moisture scavenger. In addition, the monofunctional silane compound contributes to adhesion formation by crosslinking the alkoxysilane groups during curing of the compositions. Apart from classical alkoxyvinylsilanes, monofunctional α-alkoxysilanes or γ-alkoxysilanes can be used. Furthermore, derivatives of the monofunctional silane compound which are obtainable by partial hydrolysis or bridging of the alkoxysilane groups with divalent alcohols can be used as moisture scavengers. These derivatives are also considered as monofunctional silane compounds in the sense of the invention.

The composition according to the present invention is preferably anhydrous. Traces of water that may be introduced into the composition by other components such as fillers during manufacture of the composition can be scavenged by reaction with the monofunctional silane compound.

The acid generator contained in the compositions according to the present invention represents a latent acid and serves as a catalyst for curing of the alkoxysilane compounds in the composition. "Latent" means here that it is only upon activation, for example by heat or irradiation, that the acid generator becomes active and releases an acid, which then, in the presence of moisture, triggers hydrolysis of the alkoxysilane groups, causing quick skin formation and/or curing of the compositions. However, in the presence of the non-activated acid generator the compositions remain liquid at room temperature for at least 24 hours even when exposed to moisture. Preferably, the compositions, prior to activation of the acid generator, can remain liquid at room temperature in the presence of humidity for at least 3, preferably at least 7 days.

This is achieved by the compositions, except the acid generator, not containing any further acidic, alkaline or metal-containing compounds which can accelerate crosslinking of alkoxysilanes upon exposure to moisture. Such catalysts are comprehensively described in the state of the art. These known catalysts are predominantly carboxylic acids such as acrylic acid, methacrylic acid, diacrylic acid, maleic acid, itaconic acid and acetic acid, organosulfonic acids such as trifluoromethanesulfonic acid and toluenesulfonic acid as well as inorganic acids such as phosphoric acids and phosphoric acid esters, hydrochloric acid and boric acid. As bases, in particular nitrogen compounds such as aliphatic primary, secondary and tertiary monoamines, diamines and polyamines, aromatic amines, cyclic and heterocyclic amines as well as aminosilanes, but also amidines and latent amines such as aldimines, ketimines, enamines and oxazolidines, are described. In addition, the use of organic heavy metal compounds as catalysts for moisture-curing of silanes is known, for example of carboxylates or other organic compounds of lead, iron, titanium, zinc, tin, bismuth, cobalt, zirconium, vanadium and nickel.

However, the absence of catalysts for moisture-curing in the sense of the invention does not exclude the presence of such compounds as impurities. However, these compounds are not present in the compositions according to the present invention in amounts effective for acceleration of silane crosslinking upon exposure to moisture and, in particular, are not intentionally added as an additive to the compositions according to the present invention.

The compositions according to the present invention can be used as an adhesive or sealant for bonding, casting, sealing and coating of substrates. Preferably, the compositions are used as an adhesive or sealant for fixing or casting of structural elements, in particular of structural elements which are non-radiolucent or have at least a shadow zone or capillary slots in which, due to insufficient irradiation, no radiation curing can be performed.

Another object of the invention is a method of joining or casting substrates using the composition according to the present invention, with the method comprising the following steps:

dosing the composition onto a substrate;

activating the composition on the substrate to release an acid from the acid generator, in the presence of moisture;

supplying a second substrate onto the irradiated composition within an open time to form a bonding layer; and observing a waiting time until working strength of the bonding layer is achieved;

wherein the time between dosing and activation of the composition in the presence of moisture can be 24 hours or more, with the skin formation time being less than 5 minutes and the waiting time being in a range of 1 second to 2 minutes.

In another aspect, the invention relates to a method of joining or casting structural elements in which the time of dosing and curing in the absence of moisture after activation of the compositions by heat or actinic radiation can be freely chosen within a period of at least 24 hours. Such a method is characterized in that, while excluding moisture, the composition is activated by exposure to actinic radiation and/or heating to a temperature above the decomposition temperature of the acid generator.

The so activated compositions can be cast or processed in another joining method within a desired open time.

Preferably, the compositions are activated in a closed radiolucent storage container by irradiation and/or heating, and subsequent application by means of a dosing device can be performed at different times and locations. In another embodiment, activation of the compositions, while excluding moisture, can be performed in a flow apparatus.

With moisture excluded, the so activated compositions remain in the liquid state at room temperature for at least 24 h, preferably at least 3 days, particularly preferably at least 7 days.

DETAILED DESCRIPTION OF PREFERRED EMBODIMENTS

In the following, the invention is described in detail and by way of example by means of preferred embodiments, which, however, are not to be understood as limiting.

According to the present invention, one-part compositions which are liquid at room temperature and moisture-curing are provided comprising (A) an at least bifunctional silane compound with at least two alkoxysilane groups, (B) at least one monofunctional silane compound with only one alkoxysilane group, and/or derivatives of the monofunctional silane compound with partially condensed or bridged alkoxysilane groups, and (C) at least one acid generator. In addition, further additives (D) may be contained in the compositions according to the present invention.

"One-part" or "one-part composition", in this context, means that the components stated are present together in a common formulation that is they are not stored separately.

Component (A): Bifunctional Silane Compound

Preferably, the at least bifunctional silane compound with at least two alkoxysilane groups corresponds to the general formula (I):

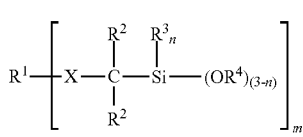

Formula (I)

wherein $R^1$ is an at least divalent organic residue, each $R^2$, independently, is a monovalent residue that is selected from the group consisting of hydrogen, linear, branched, cyclic, saturated, unsaturated and aromatic hydrocarbons, and, optionally, may be halogen-substituted and/or interrupted by 1 to 3 heteroatoms, each $R^3$, independently, is a monovalent residue that is selected from the group of linear, branched, cyclic, saturated, unsaturated and aromatic hydrocarbons, and, optionally, may be halogen-substituted or interrupted by 1 to 3 heteroatoms, each $R^4$, independently, is a monovalent residue that is selected from the group consisting of hydrogen, linear, branched, cyclic, saturated, unsaturated and aromatic hydrocarbons, and, optionally, may be halogen-substituted or interrupted by 1 to 3 heteroatoms, X is a heteroatom-containing di- or trivalent residue that is linked, via a heteroatom, in particular oxygen, nitrogen or sulfur, to the —$CR^2{}_2$—$SR^3{}_n(OR^4)_{(3-n)}$ group, and m is at least 2, preferably 2 to 9, more preferably 2 to 4; and n=0 to 2.

Preferably, $R^1$ is a residue selected from the groups consisting of (i) linear or branched, saturated or unsaturated alkyl residues with 1 to 8 C atoms, optionally interrupted by 1 to 3 heteroatoms, (ii) saturated or unsaturated cycloalkyl residues with 3-9 C atoms, optionally interrupted by 1 to 3 heteroatoms, (iii) aromatic residues with 5 to 10 C atoms, (iv) polyolefin, polyether, polyamide, polyester, polycarbonate, polyurethane, polyurea, polybutadiene, hydrogenated polybutadiene, polysiloxanes or polyacrylate, wherein each $R^1$ can be unsubstituted or bear further substituents.

Particularly preferably, $R^1$ is a polymeric residue of the above-mentioned group (iv), preferably with terminal alkoxysilane groups according to formula (I).

The compounds of general formula (I) are so-called α-(alkoxy)silane compounds which are characterized in that the (alkoxy)silane groups are in an α-position relative to a heteroatom such as oxygen, sulfur or nitrogen. The alkoxysilane group is separated from the heteroatom by a substituted or unsubstituted methylene group.

Preferably, the residue $R^1$ is a polymer backbone or copolymer backbone based on a polyether, polyester, polycarbonate, polyurethane, polyamide and polyurea.

Particularly preferably, the residue $R^1$ is a polyurethane or polyether residue.

The heteroatom-containing residue X preferably means a heteroatom-containing divalent residue such as —O—,
—S—, —N(R)—, —C(O)—O—, —O—C(O)—O—, —O—C(O)—O—N(R)—, —N(R)—C(O)—O—, —S(O)—, —S(O)$_2$—, —S(O)—O—, —S(O)$_2$—O—, —O—S(O)$_2$—O—, C(O)—N(R)—, —S(O)$_2$—N(R)—, —S(O)$_2$—N[C(O)R]—, —O—S(O)$_2$—N(R)—, —N(R)—S(O)$_2$—O—, —P(O)(OR)—O—, —O—P(O)(OR)—, —O—P(O)(OR)—O—, —P(O)(OR)—N(R)—, —N(R)—P(O)(OR)—, —O—P(O)(OR)—N(R)—, —N(R)—P(O)(OR)—O—, —N[C(O)R]—, —N=C(R)—O—, —(R)=N—O—, —C(O)—N[C(O)R]—, —N[S(O)$_2$R']—, —C(O)—N[S(O)$_2$R']— or —N[P(O)R''$_2$]—, with R representing hydrogen or optionally substituted $C_1$-$C_{20}$ alkyl or $C_6$-$C_{20}$ aryl residues, R' representing a optionally substituted $C_1$-$C_{20}$ alkyl or $C_6$-$C_{20}$ aryl residue, and R'' representing an optionally substituted $C_1$-$C_{20}$ alkyl, $C_6$-$C_{20}$ aryl, $C_1$-$C_{20}$ alkoxy or $C_6$-$C_{20}$ aryloxy residue.

Particularly preferably, X in the general formula (I) represents an oxygen or nitrogen atom or a carboxy, carbamate, carbonate, ureido, urethane or sulfonate bond.

$R^2$ is preferably hydrogen. $R^3$ is preferably $C_1$-$C_6$ alkyl, in particular methyl or ethyl, or phenyl.

The residue $R^4$ in general formula (I) preferably means a methyl or ethyl group. Preferably, n=0 or 1. Furthermore, two $R^4$ residues can be bridged to form a cycle.

According to another preferred embodiment, the residue $R^2$ is hydrogen, $R^3$ and $R^4$ mean methyl groups and n=1.

Preferably, the at least bifunctional α-alkoxysilane compounds have an average molecular weight of 2000 to 50.000 g/mol, particularly preferably approximately 10.000 to 20.000 g/mol.

The manufacture of α-alkoxysilane-terminated compounds is comprehensively described, for example, in WO 03/014226. In addition, many of the preferred α-silanes based on polyethers or polyurethanes are commercially available from Wacker Chemie AG. They are commercially sold under the trade name GENIOSIL STP-E. Examples are the STP-E10, STP-E30 types.

In another embodiment, component (A) may comprise, optionally in addition to the silane compound of formula (I) having at least two α-alkoxysilane groups, at least bifunctional alkoxysilane compounds of the general formula (II):

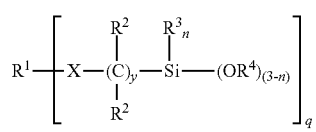

Formula (II)

wherein $R^1$, $R^2$, $R^3$ and $R^4$ have the meanings stated above for formula (I);

X is a heteroatom-containing di- or trivalent residue linked, via a heteroatom, in particular oxygen, nitrogen or sulfur, to the —$(CR^2{}_2)_y$—$SiR^3{}_n(OR^4)_{(3-n)}$ group;

n=0-2, q is at least 2, preferably 2 to 9, more preferably 2 to 4; and y means an integer from 2 to 6.

In the preferred compounds of general formula (II) y=3. These compounds are so-called γ-alkoxysilanes in which the heteroatom of residue X is separated from the silicon atom of the alkoxysilane group by an optionally substituted propylene unit.

As compared to the α-alkoxysilane, γ-alkoxysilanes have a lower reactivity. Therefore, the addition of γ-alkoxysilanes allows for reducing the reactivity of the compositions according to the present invention with regard to moisture-curing, if necessary, and thus for increasing time until skin formation after previous activation of the latent acid generator.

The manufacture of γ-alkoxysilanes is, for example, described in detail in U.S. Pat. No. 5,364,955 and the documents referenced therein. γ-Alkoxysilanes of the general formula (II) with at least two alkoxysilane-containing terminal groups are commercially available from Wacker Chemie AG. Such γ-silane-terminated polyethers are available under the designations Geniosil STP-E15 and STP-E35.

Component (A) can be composed of one or more compounds of the general formulas (I) and/or (II).

In the moisture-curable compositions according to the present invention component (A), based on the mass of the entire formulation, is typically present in a range of 10 to 99 weight percent, preferably 15 to 80 weight percent and particularly preferably 20 to 70 weight percent.

Based on the total amount of component (A), the proportion of α-alkoxysilane compounds of formula (I) in component (A) is preferably at least 10 weight percent, more preferably at least 20 weight percent, particularly preferably at least 30 weight percent.

Particularly preferably, component (A) consist of the at least bifunctional α-alkoxysilane compound in a proportion of 50 to 100 weight percent, preferably 40 to 100 weight percent, and of the at least bifunctional γ-alkoxysilane compound in a proportion of 0 to 50 weight percent, preferably 0 to 40 weight percent, each based on the total weight of component (A).

Component (B): Monofunctional Silane Compound

Apart from component (A), the compositions according to the present invention also contain, as component (B), at least one monofunctional silane compound having only one alkoxysilane group, and/or derivatives thereof. In particular, component (B) can comprise partially condensed or bridged, especially cyclically bridged, derivatives of the monofunctional silane compound obtainable by partial hydrolysis of the alkoxysilane groups or by reaction of the alkoxysilane groups with divalent alcohols.

Preferably, component (B) comprises compounds of the general formula (III):

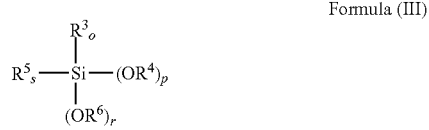

Formula (III)

wherein $R^3$ and $R^4$ have the meanings stated above in relation to formula (I);

$R^5$, independently, is a monovalent organic residue that is selected from the group of linear, branched, cyclic, saturated, unsaturated and aromatic hydrocarbons and can be optionally substituted by heteroatoms and/or interrupted by heteroatoms and is different from $R^3$;

$R^6$ is a Si residue to which further residues according to formula (Ill) may be connected, o is an integer from 0 to 3,
p is an integer from 1 to 3,
s is an integer from 0 to 3 and
r is an integer from 0 to 2,
with the sum of o+p+r+s=4.

Preferably, o is 0 or 1, p is 1 or 3, s is 1 and r is 0 or 1.

Partially condensed or bridged silane compounds of formula (Ill) are also encompassed.

The monofunctional silane compound of component (B) stabilizes the compositions according to the present invention against ingress of moisture and additionally contributes to adhesion formation during curing of the compositions.

Apart from classical alkoxyvinylsilanes, various monofunctional, in particular monomeric, α- or γ-alkoxysilanes may be used as component (B).

Preferred examples from the group of α-silanes comprise (methacryloxymethyl)methyldimethoxysilane, methacryloxymethyl-trimethoxysilane, N-trimethoxysilylmethyl-O-methylcarbamate and N-dimethoxy-(methyl)silylmethyl-O-methylcarbamate.

Examples of commercially available monofunctional α-alkoxysilanes are products from Wacker Chemie AG. Corresponding methacrylate- or carbamate-functionalized α-alkoxysilanes are available under the designations GENIOSIL XL 32, XL 33, XL 63 or XL 65.

Partially condensed monofunctional silanes can also be used as moisture scavengers. To this end, monofunctional silanes such as Geniosil XL10 (VTMO) are reacted with a defined amount of water. Such products are commercially available, for example, under the designation Dynasilan 6490 from Evonik Industries AG.

Alkoxysilanes which are optionally cyclically bridged with bifunctional alcohols can also be used as component (B). Such products are commercially available under the designation Silquest Y-15866 from Momentive.

In addition, the use of silanes as component (B) which may have a multifunction as a moisture scavenger and adhesion promoter is preferred.

A combination of several different silanes according to general formula (III) and their partially condensed or bridged derivatives is also in the sense of the invention.

However, the use of silanes acting as crosslinking catalysts in the presence of moisture and thus catalyzing curing of the composition is explicitly excluded. For example, the aminosilanes described in EP 1 421 129 A belong to this group. Examples are γ-aminopropyltrimethoxysilane or N-aminoethyl-3-aminopropyltrimethoxysilane. They catalyze premature crosslinking and thus have a negative effect on the open times and storage stabilities.

In the moisture-curable compositions according to the present invention the monofunctional silane compound (B) having only one single alkoxysilane group is typically present in a range of 0.1 to 30 weight percent, preferably 1 to 20 weight percent and particularly preferably 1.5 to 15 weight percent, each based on the mass of the entire formulation.

Component (C): Acid Generator

Apart from components (A) and (B), the compositions according to the present invention also contain at least one acid generator (C). Preferably, the acid generator comprises compounds which are able to release a strong acid by exposure to actinic radiation or by thermal activation. The released acid catalyzes hydrolysis and crosslinking of the moisture-curing groups contained in the composition. Acid generators activatable by exposure to actinic radiation are hereinafter also referred to as photolatent acid. Thermally activatable acid generators are also referred to as heat-latent acid.

Apart from the acid generator (C), the compositions do not contain any further catalysts for moisture-curing. In particular the use of catalysts based on tin compounds or aminosilanes common in the state of the art are explicitly excluded.

Suitable photolatent acids are, for example, known from cationically polymerizable systems. Aromatic arylsulfonium salts as described in WO 2003/072567 or WO 2003/008404 or aryliodonium salts as described in WO 1998/002493 or U.S. Pat. No. 6,306,555 can be used.

In addition, onium salts suitable as photolatent acids are described by J. V. Crivello and K. Dietliker in "Photoinitiators for Free Radical, Cationic & Anionic Photopolymerization", volume III of "Chemistry & Technology of UV & EB Formulation for Coatings, Inks & Paints", $2^{nd}$ edition, J. Wiley and Sons/SITA Technology (London), 1998.

Examples of different anions of sulfonium or iodonium salts are $HSO_4^-$, $PF_6^-$, $SbF_6^-$, $AsF_6^-$, $Cl^-$, $Br^-$, $I^-$, $ClO_4^-$, $PO4^-$, $SO_3CF_3^-$, tosylate, aluminate or a borate anion such as $BF_4^-$ and $B(C_6F_5)_4^-$.

Triarylsulfonium-based photoinitiators commercially available as photolatent acids are available under the trade names Chivacure 1176 from Chitech, Irgacure PAG 290 from BASF or UVI-6976 and UVI-6974 from Dow Chemical Co.

Diaryliodonium-based photoinitiators commercially available as photolatent acids are, for example, available under the trade names UV1242 or UV2257 from Deuteron and Rhodorsil 2074 from Rhodia.

Apart from photolatent acids based on iodonium and sulfonium ions, non-ionic photolatent acids can also be used in the compositions according to the present invention. Such compounds based on oxime esters and oxime sulfonic acid esters are described in WO 2013/083505 and EP 1 124 832. Commercially available non-ionic photolatent acids based on oxime sulfonic acid esters are available, for example, under the designations Irgacure PAG 103, Irgacure PAG 121 and Irgacure PAG 203, CGI 1907 from BASF.

In addition, as component (C), triazine compounds or benzoin esters can be used as non-ionic photolatent acids.

The photolatent acid used as an acid generator in the compositions according to the present invention is preferably activatable by actinic radiation of a wavelength of 200 to 480 nm, particularly preferably a wavelength of 320 to 480 nm. If necessary, the photolatent acid can be combined with a suitable sensitizer.

The use of the non-ionic photolatent acids described as component (C) is particularly preferred in the present invention.

Suitable heat-latent acids based on quaternary benzylammonium salts are described in EP 0 343 690 or WO 2005/097883. Commercially available products are available under the designations K-PURE CXC-1614 or K-PURE CXC-1733 from King Industries Inc.

In addition, aromatic sulfonium salts can be used as thermally activatable acid generators. Corresponding products are available under the designations SAN-AID SI-80L and SAN-AID SI-100L from SAN-SHIN Chemical Industry Co. Ltd. Moreover, various metal chelate complexes based on titanium or aluminum can be used as heat-latent acids.

The above lists are to be considered as exemplary for the acid generator (C) rather than limiting.

As compared to the state of the art, very low concentrations of component (C) have shown to be sufficient to achieve quick skin formation and subsequently complete curing. Considering the high costs of the respective acid generators, this is another advantage. In addition, apart from the low amounts of the acid generator (C), no further acidic, alkaline or metal-containing curing catalysts are contained. This allows, apart from an improved storage stability of the compositions, longer processing times in the presence of moisture.

In the moisture-curable compositions according to the present invention the acid generator (C) is typically contained in a proportion of 0.0001 to 5 weight percent, but preferably in proportions of at most 3 weight percent, more preferably at most 1 weight percent or at most 0.5 weight percent and particularly preferably at most 0.3 weight percent, based on the mass of the entire formulation.

The use of particularly low concentrations of the acid generator (C) is particularly possible and preferable if non-ionic photoinitiators are used and, at the same time, the mass fraction of compounds of the general formula (I) as compared to compounds of the general formula (II) in component (A) is larger, preferably larger than 50:50.

Furthermore, it is possible to use more than one acid generator in the compositions according to the present invention. The combination of a photolatent acid and a heat-latent acid is particularly preferred to additionally provide the compositions, apart from activation by actinic radiation, with an option for thermal activation. In this case, the total proportion of the acid generator, based on the mass of the entire formulation, is preferably at most 2 weight percent, more preferably at most 1 weight percent and particularly preferably at most 0.4 weight percent.

Component (D): Additives

In addition, the described compositions can contain optional components as additives (D). Preferably, the additives (D) are selected from the group of fillers, coloring agents, pigments, anti-ageing agents, fluorescent agents, stabilizers, accelerators, sensitizers, adhesion promoters, drying agents, crosslinkers, flow improvers, wetting agents, thixotropic agents, diluents, flexibilizers, polymeric thickening agents, flame retardants, corrosion inhibitors, plasticizers and tackifiers.

The above list of additives is to be considered as exemplary rather than limiting.

Formulation of the Compositions According to the Present Invention

A particularly preferred composition according to the present invention consists of the following components:

(A) 10 to 99 mass fractions of the at least bifunctional alkoxysilane compound;

(B) 0.1 to 30 mass fractions of the monofunctional alkoxysilane compound and/or a derivative thereof;

(C) 0.0001-5 mass fractions of the at least one latent acid generator, preferably 0.001 to 2 weight percent, at most 1 weight percent, at most 0.5 weight percent or at most 0.3 weight percent; and (D) 0-70 mass fractions of at least one common additive, preferably selected from the group of fillers, coloring agents, pigments, photosensitizers, anti-ageing agents, fluorescent agents, stabilizers, moisture scavengers, accelerators, adhesion promoters, crosslinkers, flow improvers, wetting agents, thixotropic agents, diluents, flexibilizers, polymeric thickening agents, flame retardants, corrosion inhibitors, plasticizers and tackifiers, alone or in combination with each other, with the mass fractions of components (A) to (D) totaling 100.

Preferably, the at least bifunctional alkoxysilane compound consists of one or more at least bifunctional α-alkoxysilane compounds, optionally blended with one or more at least bifunctional γ-alkoxysilane compounds.

Preferably, the composition has a skin formation time of less than 5 min after activation of the acid generator and ingress of humidity.

According to the present invention, the composition does not contain any compounds which could accelerate the crosslinking of alkoxysilanes upon exposure to moisture.

The manufacture of the compositions according to the present invention is characterized in that no additional complex technical procedures with regard to equipment and other aspects are required to exclude moisture. The use of dried air or protective gas during the manufacture or processing of the compositions can be dispensed with. In addition, the presence of the monofunctional silane compound according to component (B) ensures the long-term stability of the compositions against ingress of moisture.

Use of the compositions according to the present invention

Moreover, the compositions according to the present invention containing at least components (A), (B) and (C) are characterized in that they safely cure, even in shadow zones, after previous activation, for example by exposure to actinic radiation. The adjustable open times of the compositions allow processes in which the curable composition is first applied to a substrate and subsequently activated, followed by joining to a second substrate within the open-time window. This allows bonding of non-radiolucent non-transparent structural elements by pre-activation of the compositions with high process safety.

A preferred method in which the composition according to the present invention is only activated on a substrate comprises the following steps:
  a) dosing the composition onto a first substrate;
  b) activating the composition by exposure to actinic radiation of a suitable wavelength during a period of time long enough for a free acid to be released from an acid generator;
  c) supplying a second substrate onto the irradiated composition within the open time to form a bonding layer;
  d) observing a waiting time until working strength of the bonding layer is achieved; and
  e) exposing the composition to moisture until full strength of the bonding layer is achieved.

Due to the high stability against moisture, the duration of the time window between dosing and activation of the composition can be freely selected, without any losses with regard to the curing characteristics and the properties of the cured composition, within a range of at least 24 hours, preferably at least 3 days and particularly preferably at least 7 days. Apart from adjustment of the formulation, varying irradiation times or irradiation doses allow a further variation of the open-time window between steps a) and c). For automated joining processes open times of at least 10 seconds are preferred.

Moreover, because working strength is achieved so quickly, short cycle times can be achieved for structural elements joined according to the described method in industrial manufacturing processes. The waiting time from step c) to working strength is preferably in a range of 1 second to 2 minutes.

Wetting of the second substrate prior to supplying it to the first substrate allows even quicker working strengths.

For a quicker crosslinking of thicker layers it can also be advantageous to add small amounts of water shortly before activation of the composition according to the present invention.

According to another embodiment, a method of joining or casting structural elements using a composition according to the present invention is provided in which the composition, while excluding moisture, is activated by exposure to actinic radiation and/or heating to a temperature above a decomposition temperature of the acid generator.

In this method, the time of dosing and curing after activation of the compositions in a storage container in the absence of moisture at room temperature can be freely selected over a period of at least 24 hours, preferably at least 3 days and particularly preferably at least 7 days. Activation can be performed both thermally and by actinic radiation.

A method of bonding two join partners which is characterized in that the composition is activated by actinic radiation in a storage container comprises the following steps:
  a) activating the composition, while excluding moisture, by exposure to actinic radiation of a suitable wavelength in a radiolucent storage container during a period of time long enough for a free acid to be released from the photolatent acid generator;
  b) dosing the activated composition onto a first substrate;
  c) supplying a second substrate within the open time to form a bonding layer;
  d) observing a waiting time until working strength of the bonding layer is achieved; and
  e) exposing the composition to moisture until full strength of the bonding layer is achieved.

The time window between steps a) and b) can be freely selected within a range of at least 24 hours, preferably at least 3 days and particularly preferably at least 7 days, without any losses with regard to the curing characteristics and the properties of the cured composition. After activation of the composition there occurs no curing as long as the composition does not come into contact with moisture. In a storage container protected against ambient moisture the so activated composition can remain in the liquid state over a period of weeks without losing the capacity to completely cure when subsequently coming in contact with moisture. Skin formation times of the activated compositions upon exposure to moisture also remain almost constant over a period of several days. After activation, the compositions according to the present invention, even after a long dwelling time in the storage container and subsequent dosing and curing, do not show any impaired mechanical properties as compared to compositions processed directly after activation.

Preferably, the radiolucent storage container is a radiolucent cartridge.

The waiting time from step c) to working strength is preferably in a range of 1 second to 2 minutes.

For activation in a storage container, preferably compositions containing no epoxy-containing compounds in the formulation are used. Surprisingly, already small amounts of epoxy-containing silane adhesion promoters or alkyl glycidyl ethers have been shown to result in skin formation times of the activated composition not remaining as fast as before but sharply increasing even after several minutes. Such compositions can no longer be completely cured either.

According to another preferred embodiment of the above described method, steps a) and b) can be performed very shortly one after another such that the dwelling times of the composition in the storage container just suffice to completely convert the acid from the photolatent acid into its free form. As, in this way, activation of the composition by irradiation and dosing of the composition can be performed at substantially the same time, the composition can be continuously activated "while flowing" by means of a suitable dosing device. Thus, a potential interruption of the dosing procedure does not lead to the dosing valve being clogged and obstructed.

Suitable dosing devices for flow activation of the compositions by irradiation are described in DE 3 702 999 and DE 10 2007 017 842. The gradual obstruction of the reaction tubes by curing of the activated adhesive described in EP 0 508 046 cannot occur with the compositions according to the present invention as there occurs no crosslinking of the alkoxysilane groups as long as the compositions are not brought into contact with moisture. Accordingly, when using compositions based on silane-containing polymers according to the present invention, the additional constructive efforts for generating turbulent currents to improve blending of the activated compositions in the dosing channel can be dispensed with.

Another advantage of activating the compositions according to the present invention by irradiation and subsequent moisture-curing is that a high heat input into the structural elements to be processed can be avoided. This is particularly advantageous for large-scale casting applications in the field of electronics.

According to another embodiment, the compositions according to the present invention can be thermally activated. A method of bonding two join partners in which the composition is activated by heating in a storage container preferably comprises the following steps:
a) providing the composition in a heatable storage container, while excluding moisture, and activating the composition by heating it to a predetermined temperature and over a period of time long enough for the heat-latent acid to be converted into its free form;
b) dosing the activated composition onto a first substrate;
c) supplying a second substrate within an open time to form a bonding layer;
d) observing a waiting time until working strength of the bonding layer is achieved;
e) exposing the composition to moisture until full strength of the bonding layer is achieved.

The time window between steps a) and b) can be freely selected within a range of at least 24 hours, preferably at least 3 days and particularly preferably at least 7 days. After activation of the composition no curing occurs as long as the composition does not come into contact with moisture. In a storage container protected against ambient moisture the thermally activated composition can remain in the liquid state over a period of weeks without losing the capacity to completely cure when subsequently coming in contact with moisture. After activation, the compositions according to the present invention, even after a long dwelling time in the storage container and subsequent dosing and curing, do not show any significantly prolonged skin formation times or impaired mechanical properties as compared to compositions processed directly after thermal activation.

The waiting time until working strength is achieved is preferably in a range of 1 second to 2 minutes.

In another preferred embodiment of the above described method steps a) and b) can be performed very shortly one after another such that the dwelling times in the storage container just suffice to completely convert the heat-latent acid into its free form. As, in this way, thermal activation and dosing of the composition can be performed at substantially the same time, the composition can be continuously activated while flowing in a suitable dosing device with a heatable dosing channel. Suitable heatable dosing valves are available from Axiss Dosiertechnik GmbH.

When using the compositions according to the present invention there is no gradual obstruction of the heatable reaction tubes by curing of the activated compositions as there occurs no crosslinking of the alkoxysilane groups as long as they are not brought into contact with moisture.

By use of the described method the compositions according to the present invention can be activated for moisture-curing by thermal treatment with high process safety and low efforts with regard to equipment. Thus, the compositions, when using this method, are particularly suitable for large-scale casting applications.

In another particularly preferred embodiment the composition according to the present invention, in addition to a photolatent acid, also contains a heat-latent acid. Thus, the upper layer of a cast part made of the composition according to the present invention can be additionally fixed by irradiation to prevent the composition from melting away on the structural element. Thus, it is possible to perform downstream processing and manufacturing steps in a timely manner without having to wait for complete curing of the composition.

The invention is hereinafter further described by means of preferred exemplary embodiments with reference made to the above description. The examples are not to be understood as limiting.

Irradiation

For irradiation, the compositions according to the present invention were irradiated with an LED lamp DELOLUX 20/400 from DELO Industrie Klebstoffe at a wavelength of 400 nm with an intensity of $100\pm5$ mW/cm$^2$.

Moisture

"Moisture", if not indicated otherwise, is defined as 30% relative humidity at room temperature or as the moisture found on substrate surfaces under these conditions.

Room Temperature

Room temperature is defined as $23°$ C.$\pm2°$ C.

Curing

"Crosslinking" or "curing" is defined as polymerization or condensation reaction beyond the gel point. The gel point is the point at which the compositions are no longer flowable.

Skin Formation Time

Skin formation time is defined as the time after activation of the composition at which, when touching the surface of the composition, no thread forming is observed.

Open Time

Open time is defined as the time between activation of the composition by heating or irradiation and the beginning of skin formation. Within this time window the joining process may be performed. During open time the composition changes its properties with regard to viscosity, adhesion and skin formation on the surface only insignificantly. It is only after the open time that skin formation starts. The open time of the compositions according to the present invention particularly depends on temperature, irradiation dose and moisture.

Cartridges

As cartridges, radiolucent 5 ml SEMCO cartridges from PPG Industries were used.

Viscosity

Complex viscosity was measured with a rheometer Physica MCR302 from Anton Paar having a standardized measuring cone PP20 at 23° C. with a 200 µm slot and was determined at a shear rate of 10/second. To assess storage stability, the viscosity measurement was repeated at room temperature after 7-day storage of the compositions at 36° C., with light and moisture excluded. The compositions are considered as storage-stable until the viscosity has increased by 100% under the storage conditions mentioned.

Cohesion and Elongation at Break

Shouldered bars of a defined size (dimensions 25×5.5×2 mm, measuring distance 10×2×2 mm) were cast from the compositions. The shouldered bars were irradiated from both sides for 60 s each (DELOLUX 20/400; intensity: 200 mW/cm$^2$) and stored at room temperature and 50% relative humidity for 8 days. Subsequently, the shouldered bars were torn apart at a speed of 30 mm/min in a tensile testing machine from the company Zwick, and cohesion and elongation at break were determined according to DIN EN ISO 527.

Compression Shear Strength Glass/Glass

Two glass specimens (dimensions 20 mm*20 mm*5 mm) at a time were bonded using the respective composition, with an overlapping of 5 mm. To this end, a bead made of the composition was applied to the first specimen and thinly spread. After pre-activation of the composition having the parameters mentioned the second specimen was joined. The thickness of the bonding layer of 0.1 mm and the overlapping were adjusted by means of a bonding device. Curing of the composition was performed as described under the point "Cohesion and elongation at break". Bonding, in turn, was tested in a destructive test at a deformation speed of 10 mm/min on a Zwick testing machine, and the force at failure of the bonded joint was recorded.

Working Strength

Working strength is defined as the degree of strength from which joined parts can be handled in subsequent processes without the bonded joint being destroyed. The degree of the necessary working strength depends on the respective structural element and the related application. To evaluate the working strength, shear strengths were determined using the force measuring device PCE-FG500 from PCE Instruments UK Ltd. on a 500 N SLJ-B type test stand. As specimens, two joined glass compression shear bodies (dimensions 20 mm * 20 mm * 5 mm), each with an adhesive area of 100 mm$^2$ and a thickness of the bonding layer of 100 µm, were used. These were irradiated with an LED lamp DELOLUX 20/400 from DELO Industrie Klebstoffe for 4 s with an intensity of 100 mW/cm$^2$. Joining was performed during open time. The bonded joint was tested 60 s after bonding. Strength was determined using the mean value of 5 independent measurements. Build-up of strength to achieve working strength within 60 s is considered as sufficiently high if a shear strength of at least 30 N is achieved.

Manufacturing Examples

To manufacture the compositions according to the present invention, first components (B) and (D) were mixed with each other and homogenized. Subsequently, the acid generator (C) was added and the mixture was homogenized at 50° C. for 15 minutes. When used, the heat-latent acid was incorporated without additional heat input and homogenized over 12 h at room temperature. Finally, the respective silane component (A) was added and incorporated with a dissolver.

Comparative examples were manufactured analogously.

The composition of the compositions according to the present invention and the comparative examples is listed in the table below. The percentages mean weight percent, based on the total weight of the composition.

The abbreviations used in the following tables have the following meaning:

Silane 1: Geniosil STP-E 10, Wacker Chemie AG
Silane 2: Geniosil XL 33, Wacker Chemie AG
Silane 3: Dynasilan VTMO, Evonik Industries AG
Silane 4: Geniosil STP-E 35, Wacker Chemie AG
Photoinitiator 1: Irgacure PAG 121; BASF SE
Photoinitiator 2: 2-(4-methoxystyryl)-4,6-bis-(trichloromethyl)-1,3,5-triazine, Sigma-Aldrich
Heat-latent acid 1: K-PURE CXC-1614; King Industries Inc.
Plasticizer: OXSOFT TOTM, Oxea
Stabilizer: Irganox 1135; BASF SE

TABLE 1

| Variation of the acid generator | | | | | |
|---|---|---|---|---|---|
| | Examples | | | | |
| | 1 | 2 | 3 | 4 | 5 |
| Component (A) | | | | | |
| Silane 1 | 65 | 65 | 65 | 65 | 65 |
| Component (B) | | | | | |
| Silane 2 | 5 | 5 | 5 | 5 | 5 |
| Silane 3 | 1.5 | 1.5 | 1.5 | 1.5 | 1.5 |
| Component (C) | | | | | |
| Photoinitiator 1 | 0.5 | 0.1 | 0.05 | — | — |
| Photoinitiator 2 | — | — | — | 0.1 | — |
| Heat-latent acid 1 (in 0.9 parts propylene carbonate) | — | — | — | — | 1 |
| Components (D) | | | | | |
| Plasticizer | 27.6 | 28.0 | 28.05 | 28.0 | 27.1 |
| Stabilizer | 0.4 | 0.4 | 0.4 | 0.4 | 0.4 |
| Skin formation times in the presence of moisture | | | | | |
| Without activation | >7 d | >7 d | >7 d | >7 d | >7 d |
| After irradiation (4 s à 100 mW/cm$^2$) | <2 s | 6 s | 23 s | <2 s | — |
| After heating in the storage container for 12 h (80° C.) | — | — | — | — | 40 s |
| Storage stability after 3 months within the storage container | | | | | |
| Change in viscosity | ok* | ok* | ok* | ok* | ok* |

*ok = increase in viscosity was < 100%; storage stability criterion fulfilled.

The compositions described in Table 1 are characterized in that already very small amounts of photolatent acid are sufficient for quick skin formation and complete curing. Even 0.05 weight percent of a non-ionic acid generator (C), after irradiation in the presence of humidity, results in the formation of a skin within a few seconds. The skin formation times can be adjusted by the concentration of component (C) or the irradiation dose. Furthermore, the compositions remain liquid for at least 7 days after dosing even in the presence of moisture and do not cure as long as there is no activation of component (C) by irradiation or heating. Example 5 shows that, apart from activation by irradiation with the aid of a heat-latent acid generator (C), the compositions can also be thermally activated for moisture-curing in a storage container, for example in a cartridge.

TABLE 2

Stability

| | Example | Comparative examples | | |
|---|---|---|---|---|
| | 6 | 7 | 8 | 9 |
| Component (A) | | | | |
| Silane 1 | 60 | 60 | 60 | — |
| Component (B) | | | | |
| Silane 2 | 5 | — | 5 | 58.5 |
| Silane 3 | 1.5 | — | 1.5 | 1.5 |
| Component (C) | | | | |
| Photoinitiator 1 | 0.05 | 0.05 | — | 0.05 |
| Components (D) | | | | |
| Plasticizer | 33.05 | 39.55 | 33.1 | 39.55 |
| Stabilizer | 0.4 | 0.4 | 0.4 | 0.4 |
| Skin formation times after exposure (4 s @ 100 mW/cm$^2$) | | | | |
| Initially (no storage time) | 29 s | 21 s | >7 d | >24 h |
| After 7-day storage in the presence of humidity | 27 s | 17 s | * | * |
| After 10-day storage in the storage container at 36° C.; exclusion of moisture | 27 s | 13 s | * | * |
| Viscosities | | | | |
| Initially (no storage time) | 2240 | 3570 | 2230 | 5 |
| After 10-day storage in the storage container at 36° C. [mPa*s]; exclusion of moisture | 2150 | 7831 | n.d. | n.d. |

\* = no skin formation occurred; incomplete curing

The compositions were stored in the dark away from light.

The compositions described in Table 2 were dosed and irradiated shortly after manufacturing without any additional storage times. After irradiation, the respective initial skin formation times were determined. The composition according to Example 6 has a skin formation time of 29 s. Dispensing with the acid generator (C) according to Comparative Example 8 or the silane component (A) according to Comparative Example 9 results in very long skin formation times. In addition, the compositions of Comparative Examples 8 and 9 do not completely cure even after a long time. Comparative Example 7 shows that without addition of the silane component (B) as a moisture scavenger the skin formation time after open storage of the composition in the dark in the presence of humidity starts to decrease after 7 days. Skin formation time is additionally shortened when the composition from Comparative Example 7 is stored at 36° C. After subsequent dosing and irradiation, skin formation occurs within 13 s and thus much more quickly than in composition 6 according to the present invention. The compositions from Comparative Examples 8 and 9 show no skin formation after storage at 36° C. and irradiation and do not cure completely.

Composition 6 according to the present invention, however, remains in the liquid state even after being openly stored for more than 7 days in the dark and in the presence of moisture, and, after irradiation, shows a skin formation time and curing characteristics comparable to those after initial irradiation without storage. Furthermore, the composition according to Example 6 can also be stored at an elevated temperature of 36° C. for at least 10 days without the viscosity and curing characteristics changing significantly. The constant skin formation times allow stable open-time windows during pre-activation processes.

TABLE 3

Photoactivation in a cartridge

| | Composition according to Example 2 | | | | |
|---|---|---|---|---|---|
| Time after irradiation [d] | 0 | 1 | 2 | 5 | 14 |
| Skin formation time [s] | 10 | 10 | 11 | 11 | 11 |
| Compression shear strength glass/glass [MPa] | 0.9 | n.d. | n.d. | n.d. | 0.9 |
| Elongation at break [%] | 91 | n.d. | n.d. | n.d. | 88 |
| Cohesion [MPa] | 0.20 | n.d. | n.d. | n.d. | 0.21 | n.d. = not determined

Table 3 shows the skin formation times and compression shear strengths of the composition from Example 2 according to the present invention after photoactivation and subsequent dosing at an interval of up to two weeks. Photoactivation was performed by irradiating the compositions in a cartridge from all sides over a period of 240 s with an intensity of 200 mW/cm$^2$. Subsequently, the cartridge with the activated composition was stored at room temperature, with light and moisture excluded. The mechanical properties of the composition after bonding were tested following 7-day storage of the specimens in the presence of humidity.

Even after a prolonged dwelling time of the activated compositions in the cartridge skin formation times remain unchanged. Even 14 days after photoactivation skin formation times are seen which are comparable to the skin formation times occurring directly after activation. The mechanical properties such as compression shear strength, elongation at break and cohesion also remain constant.

TABLE 4

Adhesion formation

| | Example 2 | Example 10 | Comparative Example 11 | Comparative Example 12 |
|---|---|---|---|---|
| Component (A) | | | | |
| Silane 1 | 65 | 40 | 65 | 65 |
| Silane 4 | — | 25 | — | — |
| Component (B) | | | | |
| Silane 2 | 5 | 5 | 5 | 5 |
| Silane 3 | 1.5 | 1.5 | 1.5 | 1.5 |
| Component (C) | | | | |
| Photoinitiator 1 | 0.1 | 0.1 | 0.1 | 0.1 |
| Components (D) | | | | |
| Plasticizer | 28.0 | 28.0 | 27.9 | 27.7 |
| Stabilizer | 0.4 | 0.4 | 0.4 | 0.4 |
| γ-Aminopropyltri-methoxysilane | — | — | — | 0.3 |
| DBTL (dibutyltin dilaurate) | — | — | 0.1 | — |
| Skin formation time after irradiation for (4 s à 100 mW/cm$^2$) | 6 s | 10 s | 135 s | ~60 min |
| Shear strength, 60 s after joining | 68 N | 209 N | * | * |
| Habitus after 24-hour storage | liquid | liquid | thickened | cured |

*not measurable; composition already liquid.

The compositions were stored under exclusion of light in the presence of humidity.

Table 4 shows the skin formation times and working strengths of the compositions according to the present invention as compared to compositions containing additional catalysts such as DBTL or an aminosilane to catalyze moisture-curing. The addition of DBTL (Comparative Example 11) or γ-Aminopropyltrimethoxysilane (Comparative Example 12) results in a marked slowdown of skin formation after irradiation. Moreover, no strengths can be determined after 60 s as the compositions are still liquid at this point. The compositions from Examples 2 and 10 according to the present invention, however, form a skin within a few seconds after irradiation. At the same time, these compositions achieve a sufficient working strength within 60 s. Without irradiation and after storage in the presence of humidity for 24 h the composition from Comparative Example 12 is completely cured and the composition from Comparative Example 11 is heavily thickened, while the compositions according to the present invention remain in the liquid state.

The invention claimed is:

1. A one-part composition that is liquid at room temperature and moisture-curing, comprising:
   (A) at least one at least bifunctional silane compound having at least two alkoxysilane groups,
   (B) at least one monofunctional silane compound having one single alkoxysilane group, and/or derivatives of the monofunctional silane compound with partially condensed or bridged alkoxysilane groups; and
   (C) at least one acid generator that is activatable upon exposure to heat and/or actinic radiation and releases an acid;
   wherein the at least bifunctional silane compound comprises one or more at least bifunctional α-alkoxysilane compounds;
   wherein the composition, apart from the acid generator, does not contain any further catalysts for moisture-curing of alkoxysilanes, and
   wherein the composition, after activation of the acid generator, cures in the presence of moisture but remains liquid over a period of at least 24 hours at room temperature in the presence of humidity prior to activation of the acid generator.

2. The composition according to claim 1, wherein the composition remains liquid for at least 3 days at room temperature in the presence of humidity prior to activation of the acid generator.

3. The composition according to claim 1, wherein the α-alkoxysilane compound corresponds to the following formula (I):

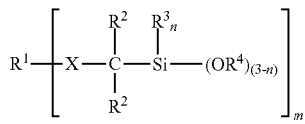

wherein
R$^1$ is an at least divalent organic residue,
each R$^2$, independently, is a monovalent residue that is selected from the group consisting of hydrogen, linear, branched, cyclic, saturated, unsaturated and aromatic hydrocarbons and, optionally, may be halogen-substituted and/or interrupted by 1 to 3 heteroatoms,
each R$^3$, independently, is a monovalent residue that is selected from the group of linear, branched, cyclic, saturated, unsaturated and aromatic hydrocarbons and, optionally, may be halogen-substituted or interrupted by 1 to 3 heteroatoms,
each R$^4$, independently, is a monovalent residue that is selected from the group consisting of hydrogen, linear, branched, cyclic, saturated, unsaturated and aromatic hydrocarbons and may optionally be halogen-substituted or interrupted by 1 to 3 heteroatoms,
X is a heteroatom-containing di- or trivalent residue that is linked, via a heteroatom to the —CR$^2{}_2$—SiR$^3{}_n$(OR$^4$)$_{(3-n)}$ group,
m is at least 2, and
n=0 to 2.

4. The composition according to claim 3, wherein R$^1$ is a residue selected from the groups consisting of (i) linear or branched, saturated or unsaturated alkyl residues having 1 to 8 C atoms, optionally interrupted by 1 to 3 heteroatoms, (ii) saturated or unsaturated cycloalkyl residues having 3 to 9 C atoms, optionally interrupted by 1 to 3 heteroatoms, (iii) aromatic residues having 5 to 10 C atoms, (iv) polyolefin, polyether, polyamide, polyester, polycarbonate, polyurethane, polyurea, siloxanes, polybutadienes, hydrogenated polybutadienes or polyacrylate, wherein each R$^1$ can be unsubstituted or bear further substituents.

5. The composition according to claim 1, wherein the at least bifunctional silane compound has an at least bifunctional alkoxysilane compound with at least two alkoxysilane groups, wherein the alkoxysilane groups comprise a Si-atom linked, via an alkylene group, to a heteroatom, wherein the alkylene group has at least two C bridge atoms.

6. The compositions according to claim 5, wherein the at least bifunctional alkoxysilane compound corresponds to the general formula (II):

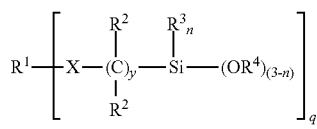

wherein
$R^1$ is an at least divalent organic residue,
each $R^2$, independently, is a monovalent residue that is selected from the group consisting of hydrogen, linear, branched, cyclic, saturated, unsaturated and aromatic hydrocarbons and, optionally, may be halogen-substituted and/or interrupted by 1 to 3 heteroatoms,
each $R^3$, independently, is a monovalent residue that is selected from the group of linear, branched, cyclic, saturated, unsaturated and aromatic hydrocarbons and, optionally, may be halogen-substituted or interrupted by 1 to 3 heteroatoms,
each $R^4$, independently, is a monovalent residue that is selected from the group consisting of hydrogen, linear, branched, cyclic, saturated, unsaturated and aromatic hydrocarbons and may optionally be halogen-substituted or interrupted by 1 to 3 heteroatoms,
X is a heteroatom-containing di- or trivalent residue linked, via a heteroatom to the $—(CR^2{}_2)_y—SiR_n(OR^4)_{(3-n)}$ group,
N=0-2,
Q=2-9, and
Y=2-6.

7. The composition according to claim 5, wherein the alkylene group has 3 to 6 C bridge atoms.

8. The composition according to claim 1, wherein component (A) contains the α-alkoxysilane compound in a proportion of at least 10 weight percent.

9. The composition according to claim 8, wherein component (A) contains the α-alkoxysilane compound in a proportion of 50 to 100 weight percent.

10. The composition according to claim 1, wherein the monofunctional alkoxysilane compound corresponds to the general formula (III):

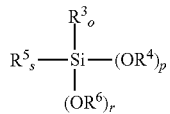

wherein
each $R^3$, independently, is a monovalent residue that is selected from the group of linear, branched, cyclic, saturated, unsaturated and aromatic hydrocarbons and, optionally, may be halogen-substituted or interrupted by 1 to 3 heteroatoms,
each $R^4$, independently, is a monovalent residue that is selected from the group consisting of hydrogen, linear, branched, cyclic, saturated, unsaturated and aromatic hydrocarbons and may optionally be halogen-substituted or interrupted by 1 to 3 heteroatoms, $R^5$, independently, is a monovalent organic residue that is selected from the group of linear, branched, cyclic, saturated, unsaturated and aromatic hydrocarbons and may optionally be substituted by heteroatoms and/or interrupted by heteroatoms and is different from $R^3$;
$R^6$ is a Si-residue to which further residues according to formula (III) may be connected, wherein
o is an integer from 0 to 3,
p is an integer from 1 to 3,
s is an integer from 0 to 3 and
r is an integer from 0 to 2, with the sum of o+p+s+r=4.

11. The composition according to claim 1, wherein the acid generator comprises a photolatent acid.

12. The composition according to claim 11, wherein the photolatent acid is selected from the group consisting of onium salts, oxime esters, triazines, benzoin esters.

13. The composition according to claim 11, wherein the photolatent acid is activatable by exposure to actinic radiation of a wavelength ranging from 200 to 480 nm.

14. The composition according to claim 1, consisting of:
(A) 10 to 99 mass fractions of the at least bifunctional alkoxysilane compound;
(B) 0.1 to 30 mass fractions of the monofunctional alkoxysilane compound;
(C) 0.0001-5 mass fractions of the at least one acid generator;
(D) 0-70 mass fractions of at least one additive, selected from the group of fillers, coloring agents, pigments, photosensitizers, anti-ageing agents, fluorescent agents, stabilizers, moisture scavengers, accelerators, adhesion promoters, crosslinkers, flow improvers, wetting agents, thixotropic agents, diluents, flexibilizers, polymeric thickening agents, flame retardants, corrosion inhibitors, plasticizers and tackifiers, alone or in combination with each other,
wherein the mass fractions of components (A) to (D) total 100.

15. The composition according to claim 1, wherein the composition has a skin formation time of less than 5 min after activation of the acid generator and ingress of humidity.

16. A method of joining or casting substrates using the composition according to claim 1, with the method comprising the following steps:
dosing the composition onto a substrate;
activating by irradiation the composition on the substrate to release an acid from the acid generator, in the presence of moisture;
supplying a second substrate to the irradiated composition within an open time to form a bonding layer; and
observing a waiting time until working strength of the bonding layer is achieved;
wherein a skin formulation time is less than 5 minutes and the waiting time ranges from 1 second to 2 minutes.

17. The method according to claim 16, wherein the time between dosing and activation of the composition in the presence of moisture is 24 hours or more.

18. A method of joining or casting structural elements using the composition according to claim 1, wherein, while excluding moisture, the composition is activated by exposure to actinic radiation and/or heating to a temperature above a decomposition temperature of the acid generator.

19. The method according to claim 18, wherein the composition is activated in a flow apparatus.

20. The method according to claim 18, wherein, with moisture excluded, the activated composition remains in the liquid state at room temperature for at least 24 h.

21. The method according to claim 18, wherein, with moisture excluded, the activated composition remains in the liquid state at room temperature for at least 3 days.

22. The composition according to claim 1, wherein the composition is an adhesive or sealant for bonding, casting, sealing and coating of substrates.

23. The composition of claim 22, wherein the substrate comprises one or more structural elements which are non-radiolucent or have at least a shadow zone or capillary slots in which, due to insufficient irradiation, no radiation curing can be performed.

24. The composition according to claim 1, wherein the composition remains liquid for at least 7 days at room temperature in the presence of humidity prior to activation of the acid generator.

\* \* \* \* \*